Patented Aug. 31, 1937

UNITED STATES PATENT OFFICE 2,091,358

WATER INSOLUBLE AZO DYESTUFFS

Otto Goll, Leverkusen-I. G.-Werk, Rudolf Ritter Wolff, Cologne-Mulheim, and Felix Gund, Cologne-Rhine, Germany, assignors to General Aniline Works, Inc., New York, N. Y., a corporation of Delaware No Drawing. Application January 30, 1935, Serial No. 4,150. In Germany February 3, 1934

7 Claims. (Cl. 260—95)

The present invention relates to water insoluble azo dyestuffs, more particularly it relates to compounds which may be represented by the probable general formula:

R'O—R—CO—NH—R'''—N=N—R'' wherein R stands for an alkylene group, R' stands for alkyl, alkyloxyalkyl, aralkyl or a hydroaromatic radical, R'' stands for the radical of an aromatic o-hydroxycarboxylic acid arylamide which has been coupled in o-position to the hydroxy group, and R''' represents a radical of the benzene series bearing the group —N=N—R'' in meta- or para-position to the group R'O—R—CO—NH—.

The aromatic bases used as diazotization components in the manufacture of our new dyestuffs are obtainable by condensing a p- or m-nitroamine of the benzene series with carboxylic acids of the general formula: HOOC—R—OR', wherein R and R' mean the same as stated above, or with a functional derivative of the named acids, such as the acid halogenides or the esters thereof, and reducing the nitro group to the amino group according to methods known per se.

Part of the new bases is also obtainable by acylating amines of the benzene series in the above-identified manner, i. e., introducing the group —CO—R—OR' into the amino group, and subsequently introducing the amino group into the m- or p-position according to methods known per se by nitrating and reducing the nitro group. In performing this modification of producing the new bases care is to be taken that, if necessary, a suitable substitution is present in the benzene nucleus, in order to effect a nitration into the m- or p-position.

The new water insoluble azodyestuffs in accordance with the present invention are obtainable by diazotizing in the usual manner the afore-mentioned new bases and coupling in substance or on a substratum, especially the vegetable fibre, with an aromatic o-hydroxycarboxylic acid arylamide, coupling in o-position to the hydroxy group, such as an arylamide of 2,3-hydroxynaphthoic acid, 2-hydroxyanthracene-3-carboxylic acid, 2-hydroxycarbazole-3-carboxylic acid, 3-hydroxydiphenyleneoxide-2-carboxylic acid and 3-hydroxydiphenylenesulfide-2-carboxylic acid. Depending upon the specific bases and coupling components used, there are obtained various shades of good fastness properties, most technically valuable being those dyestuffs which are derived from bases of the general formula:

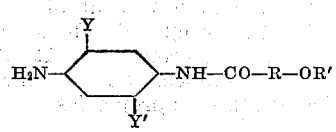

wherein R and R' mean the same as stated above, and Y and Y' stand for non-solubilizing substituents, such as alkyl, alkoxy and halogen.

The invention is illustrated by the following examples, without being limited thereto:

Example 1

Cotton is impregnated in the usual manner in an impregnating bath containing 3 grams per litre of the arylamide from aminohydroquinone-dimethylether and 2,3-hydroxynaphthoic acid and, without rinsing, introduced for about 20 minutes into a developing bath prepared from 3 grams per litre of 1-amino-4-methoxyacetyl-amino-2,5-dimethoxybenzene. After rinsing, soaping, rinsing again and drying, there is obtained a reddish-blue of good fastness properties. The dyestuff corresponds to the following formula:

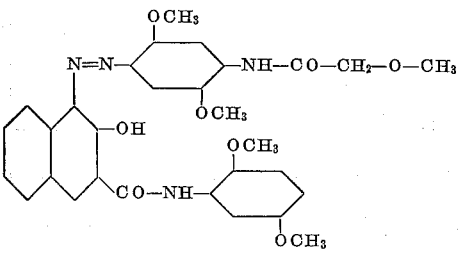

Example 2

In an analogous manner to that described in Example 1 the dyestuff from 2,3-hydroxynaphthoic acid-4-chloroanilide and diazotized 1-amino-4-methoxyacetyl-amino-2,5-diethoxybenzene yields on cotton blue shades of good fastness properties. The dyestuff corresponds to the following formula:

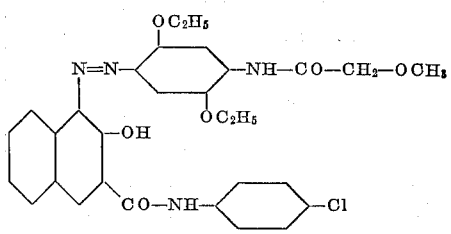

Example 3

In an analogous manner to that described in Example 1 the dyestuffs from 2,3-hydroxynaphthoic acid-4-chloroanilide or -2-methyl-4-methoxy anilide and diazotized 1-amino-3- methoxyacetylamino - 4,6 - dimethoxybenzene yield on cotton violet shades.

In the following table there are given further combinations prepared in accordance with the present invention and the shades obtained therewith on cotton:

wherein R stands for an alkylene group, R' stands for a member selected from the group consisting of alkyl, alkyloxyalkyl and a hydroaromatic radical, R'' stands for the radical of an aromatic o-hydroxycarboxylic acid arylamide which has been coupled in o-position to the hydroxy group,

| Coupling component | Diazotization component | Shade |
|---|---|---|
| 2',3'-hydroxynaphthoyl-: | | |
| -1-amino-4-chlorobenzene | 1-amino-2,5-dimethoxy-4-methoxyacetylaminobenzene. | Reddish navy-blue. |
| -1-amino-3-chloro-4-methoxybenzene | ----do---- | Do. |
| -1-amino-2,4-dimethoxy-5-chlorobenzene | ----do---- | Do. |
| -1-amino-3-nitrobenzene | ----do---- | Bluish-violet. |
| -aniline | 1-amino-2,5-diethoxy-4-methoxyacetylaminobenzene. | Reddish blue. |
| -1-amino-2-methyl-4-methoxybenzene | ----do---- | Navy blue. |
| -1-amino-4-ethoxybenzene | ----do---- | Do. |
| -1-amino-4-methoxybenzene | ----do---- | Do. |
| -1-amino-2,4-dimethoxy-5-chlorobenzene | ----do---- | Dull bluish-violet. |
| -1-amino-4-methylbenzene | ----do---- | Blue. |
| -1-amino-2,5-dimethoxybenzene | ----do---- | Dull bluish-violet. |
| -1-amino-2-methyl-4-methoxybenzene | 1-amino-2,5-dimethoxy-4-ethoxyacetylaminobenzene. | Reddish dark blue. |
| -1-amino-2-methyl-4-methoxybenzene | 1-amino-2,5-diethoxy-4-ethoxyacetylaminobenzene. | Navy blue. |
| -1-amino-4-ethoxybenzene | ----do---- | Do. |
| -1-amino-4-methoxybenzene | ----do---- | Do. |
| -1-amino-2,4-dimethoxy-5-chlorobenzene | ----do---- | Do. |
| -1-amino-4-chlorobenzene | ----do---- | Blue. |
| -aniline | 1-amino-2,5-diethoxy-4-isopropyloxyacetylaminobenzene. | Do. |
| -1-amino-4-methoxybenzene | ----do---- | Navy blue. |
| -1-amino-2,4-dimethoxy-5-chlorobenzene | ----do---- | Do. |
| -aniline | 1-amino-2-ethoxy-5-methoxy-4-methoxyacetylaminobenzene. | Reddish navy blue. |
| -1-amino-2-methylbenzene | ----do---- | Blue. |
| -1-amino-4-methylbenzene | ----do---- | Do. |
| -1-amino-4-chlorobenzene | 1-amino-2,5-diethoxy-4-primary-isobutyloxyacetylaminobenzene. | Reddish blue. |
| -1-amino-4-methylbenzene | 1-amino-2,5-diethoxy-4-(γ-methoxy)-n-butyloxy-acetylaminobenzene. | Do. |
| -1-amino-4-ethoxybenzene | ----do---- | Dull bluish violet. |
| -1-amino-2,4-dimethoxy-5-chlorobenzene | 1-amino-2,5-diethoxy-4-hexahydrophenyloxyacetylaminobenzene. | Do. |
| -1-amino-4-chlorobenzene | 1-amino-2,5-diethoxy-4-benzyloxyacetylaminobenzene. | Bluish violet. |
| -1-amino-2,4-dimethoxy-5-chlorobenzene | 1-amino-2-phenoxy-4-methoxyacetylaminobenzene. | Corinth. |
| -1-amino-2,5-dimethyl-4-methoxybenzene | 1-amino-2-methyl-5-methoxy-4-ethoxyacetylaminobenzene. | Reddish violet. |
| -1-amino-2-methyl-4-chlorobenzene | 1-amino-2-chloro-5-methoxy-4-ethoxyacetylaminobenzene. | Do. |
| 1,2-benzocarbazole-5',4'-hydroxycarboxylic acid-o-methyl-p-anisidide of the formula: | ----do---- | Dark blue. |
| 2',3'-hydroxynaphthoyl-: | | |
| -1-amino-4-chlorobenzene | 1-amino-2,5-diethoxy-4-β-methoxybutyrylaminobenzene. | Greenish blue. |
| -1-aminobenzene | ----do---- | Do. |
| -1-amino-4-methylbenzene | ----do---- | Do. |
| -1-amino-2-methyl-4-methoxybenzene | ----do---- | Reddish blue. |
| -1-aminonaphthalene | ----do---- | Navy blue. |

We claim:

1. Water insoluble azodyestuffs of the general formula:

$$R'O-R-CO-NH-R'''-N=N-R''$$

and R''' represents a radical of the benzene series bearing the group —N=N—R'' in meta or para position to the group R'O—R—CO—NH—, yielding, when produced on the fibre, various shades of good fastness properties.

2. Water insoluble azodyestuffs of the general formula:

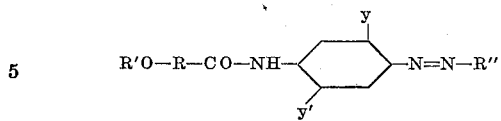

wherein R' stands for alkyl, R stands for an alkylene group, y and y' stand for members selected from the group consisting of hydrogen, alkyl, alkoxy and halogen and R" stands for the radical of an aromatic o-hydroxycarboxylic acid arylamide which has been coupled in o-position to the hydroxy group, yielding, when produced on the fibre, various shades of good fastness properties.

3. The dyestuff of the following formula:

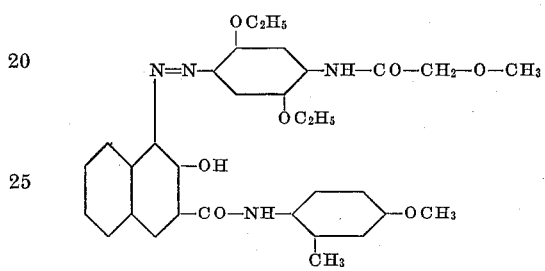

yielding, when produced on the fibre, clear reddish-blue shades of good fastness properties.

4. The dyestuff of the following formula:

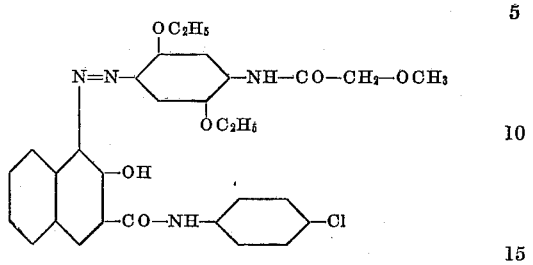

yielding, when produced on the fibre, blue shades of good fastness properties.

5. Fibre dyed with a dyestuff as claimed in claim 2.

6. Fibre dyed with the dyestuff as claimed in claim 3.

7. Fibre dyed with the dyestuff as claimed in claim 4.

OTTO GOLL.
RUDOLF RITTER WOLFF.
FELIX GUND.